（12) United States Patent
Al-Hellani et al.

US009334398B2

(10) Patent No.: US 9,334,398 B2
(45) Date of Patent: May 10, 2016

(54) AQUEOUS POLYMER DISPERSION OBTAINABLE BY FREE-RADICALLY INITIATED EMULSION POLYMERIZATION IN THE PRESENCE OF LIGNOSULFONATE

(71) Applicant: BASF SE, Ludwigshafen (DE)

(72) Inventors: Rabie Al-Hellani, Ludwigshafen (DE); Carmen-Elena Cimpeanu, Ludwigshafen (DE); Juergen Schmidt-Thuemmes, Neuhofen (DE); Dirk Lawrenz, Hassloch (DE); Kristina Georgieva, Mannheim (DE); Anja Song, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/375,937

(22) PCT Filed: Feb. 11, 2013

(86) PCT No.: PCT/EP2013/052640
§ 371 (c)(1),
(2) Date: Jul. 31, 2014

(87) PCT Pub. No.: WO2013/120790
PCT Pub. Date: Aug. 22, 2013

(65) Prior Publication Data
US 2014/0342171 A1 Nov. 20, 2014

Related U.S. Application Data

(60) Provisional application No. 61/598,374, filed on Feb. 14, 2012.

(30) Foreign Application Priority Data

Feb. 14, 2012 (EP) .................................... 12155408

(51) Int. Cl.
*C08L 25/14* (2006.01)
*C08F 2/22* (2006.01)
*C08F 2/44* (2006.01)
*C08L 33/08* (2006.01)
*C09D 4/06* (2006.01)
*C09D 7/12* (2006.01)
*D21H 19/56* (2006.01)

(52) U.S. Cl.
CPC . *C08L 25/14* (2013.01); *C08F 2/22* (2013.01); *C08F 2/44* (2013.01); *C08L 33/08* (2013.01); *C09D 4/06* (2013.01); *C09D 7/125* (2013.01); *D21H 19/56* (2013.01); *Y10T 428/31906* (2015.04)

(58) Field of Classification Search
CPC ........... C08L 24/14; C08L 33/08; C09D 4/06; C09D 7/125; D21H 19/56; C08F 2/22; C08F 2/44; Y10T 428/31906
USPC .................... 428/514; 524/734, 799
See application file for complete search history.

(56) References Cited

U.S. PATENT DOCUMENTS

| 4,064,081 | A | 12/1977 | McCoy et al. |
|---|---|---|---|
| 8,637,160 | B2 | 1/2014 | Schmidt-Thuemmes et al. |
| 8,771,812 | B2 | 7/2014 | Seyffer et al. |
| 8,841,382 | B2 | 9/2014 | Cristadoro et al. |
| 2009/0318605 | A1 | 12/2009 | Dyllick-Brenzinger et al. |
| 2010/0016478 | A1 | 1/2010 | Brockmeyer et al. |
| 2011/0247746 | A1 | 10/2011 | Schumacher et al. |
| 2012/0028064 | A1* | 2/2012 | Perello et al. ............ 428/511 |
| 2012/0048463 | A1 | 3/2012 | Cimpeanu et al. |
| 2012/0053283 | A1 | 3/2012 | Dyllick-Brenzinger et al. |
| 2012/0082629 | A1 | 4/2012 | Türk et al. |
| 2012/0308749 | A1 | 12/2012 | Seyffer et al. |
| 2013/0245168 | A1 | 9/2013 | Song et al. |
| 2014/0234233 | A1 | 8/2014 | Türk et al. |

(Continued)

FOREIGN PATENT DOCUMENTS

| DE | 27 00 447 A1 | 7/1977 |
|---|---|---|
| EP | 1 306 124 A1 | 5/2003 |
| JP | 2-151601 A | 6/1990 |
| JP | 2005-29457 A | 2/2005 |
| WO | WO2008/034813 * | 3/2008 |
| WO | WO 2008/034813 A1 | 3/2008 |
| WO | WO2008/074690 * | 6/2008 |
| WO | WO 2008/074690 A1 | 6/2008 |
| WO | WO 2011/124651 A1 | 10/2011 |
| WO | WO 2011/157679 A1 | 12/2011 |
| WO | WO 2012/028520 A1 | 3/2012 |
| WO | WO 2012/028527 A1 | 3/2012 |
| WO | WO 2012/029038 A1 | 3/2012 |
| WO | WO 2012/069460 A1 | 5/2012 |

(Continued)

OTHER PUBLICATIONS

U.S. Appl. No. 14/351,463, filed Apr. 11, 2014, Lawrenz, et al.
U.S. Appl. No. 14/356,530, filed May 6, 2014, Seyffer, et al.
U.S. Appl. No. 14/360,803, filed May 27, 2014, Seyffer, et al.
International Search Report issued Mar. 27, 2013 in PCT/EP2013/052640.

*Primary Examiner* — Leszek Kiliman
(74) *Attorney, Agent, or Firm* — Oblon, McClelland, Maier & Neustadt, L.L.P

(57) ABSTRACT

Described is an aqueous polymer dispersion comprising a chain growth addition polymer obtainable via free-radically initiated emulsion polymerization from ethylenically unsaturated, free-radically polymerizable monomers, wherein the chain growth addition polymer is formed to an extent of not less than 60 wt % from primary monomers selected from vinylaromatic compounds, conjugated aliphatic dienes, vinyl esters of saturated $C_1$- to $C_{20}$-carboxylic acids, esters of acrylic acid or of methacrylic acid with monohydric $C_1$- to $C_{20}$-alcohols, aliphatic hydrocarbons having 2 to 8 carbon atoms and one or two double bonds, or mixtures thereof, wherein the monomers are polymerized in the presence of lignosulfonate and wherein the chain growth addition polymer is branched or crosslinked. Also described is a process for preparing the aqueous polymer dispersion. The polymer dispersion is useful for preparing paper coating compositions.

19 Claims, No Drawings

(56) References Cited

U.S. PATENT DOCUMENTS

2014/0251563 A1 9/2014 Lawrenz et al.
2014/0275415 A1 9/2014 Cimpeanu et al.

FOREIGN PATENT DOCUMENTS

| WO | WO 2012/163749 A2 | 12/2012 |
| WO | WO 2012/163821 A1 | 12/2012 |
| WO | WO 2013/053840 A2 | 4/2013 |
| WO | WO 2013/061286 A1 | 5/2013 |
| WO | WO 2013/068363 A1 | 5/2013 |
| WO | WO 2013/068375 A1 | 5/2013 |
| WO | WO 2013/083504 A1 | 6/2013 |

* cited by examiner

AQUEOUS POLYMER DISPERSION OBTAINABLE BY FREE-RADICALLY INITIATED EMULSION POLYMERIZATION IN THE PRESENCE OF LIGNOSULFONATE

The invention relates to aqueous polymer dispersions comprising a chain growth addition polymer obtainable via free-radically initiated emulsion polymerization from ethylenically unsaturated, free-radically polymerizable monomers, wherein the polymer is formed from certain primary monomers and the polymerization is effected in the presence of lignosulfonate and the polymer is a branched or crosslinked polymer.

The invention also relates to a process for preparing the aqueous polymer dispersions and to using the polymer dispersions for preparing paper coating compositions.

Aqueous polymer dispersions obtainable via free-radically initiated emulsion polymerization from ethylenically unsaturated, free-radically polymerizable monomers have a variety of use destinations. Binders for paper coating compositions, for instance, are known that are based on copolymers of vinylaromatic compounds such as, for example, styrene, aliphatic dienes such as, for example, 1,3-butadiene and an ethylenically unsaturated acid such as, for example, acrylic acid or methacrylic acid, or based on styrene-acrylate copolymers. It is desirable for at least some of the synthetic monomers such as styrene for example to be replaced by compounds based on natural, renewable raw materials without the good performance characteristics of currently commercially available polymer dispersions being unacceptably impaired as a result. Use in paper coatings has a particular demand for polymeric binders with a high binding force and for paper coatings comprising polymeric binders and having good surface strength, for example a good dry pick resistance and a good wet pick resistance. Polymer dispersions prepared in the presence of lignosulfonates are known from EP 1306124, DE 2700447 and JP 02-151601. Chain growth addition polymers of this type frequently lead, when used in paper coatings, to disadvantageous performance characteristics compared with currently commercially available products such as, for example, styrene-butadiene or styrene-acrylate binders with regard to dry pick resistance, wet pick resistance or in the offset test.

The invention has for its object to provide aqueous polymer dispersions which are at least partly obtainable on the basis of renewable raw materials and shall have very good performance characteristics when used as binders in paper coatings, especially a very good dry pick resistance and a very good wet pick resistance.

The object is achieved in accordance with the invention by an aqueous polymer dispersion comprising a chain growth addition polymer obtainable via free-radically initiated emulsion polymerization from one or more ethylenically unsaturated, free-radically polymerizable monomers, wherein the chain growth addition polymer is formed to an extent of not less than 50 wt % from primary monomers selected from the group consisting of vinylaromatic compounds, conjugated aliphatic dienes, vinyl esters of saturated $C_1$- to $C_{20}$-carboxylic acids, esters of acrylic acid or of methacrylic acid with monohydric $C_1$- to $C_{20}$-alcohols, aliphatic hydrocarbons having 2 to 8 carbon atoms and one or two double bonds, or mixtures thereof, wherein the monomers are polymerized in the presence of lignosulfonate and wherein the chain growth addition polymer is branched or crosslinked via copolymerization of at least one branching or crosslinking monomer other than the primary monomers and selected from monomers having two or more free-radically polymerizable, ethylenically unsaturated groups.

Lignosulfonate is preferably used in an amount of 10 to 100 parts by weight, preferably of 20 to 80 parts by weight and particularly preferably of 30 to 70 parts by weight per 100 parts by weight of monomers, based on the sum total of all monomers. Lignosulfonates are the salts of lignosulfonic acid, soluble products of converting lignin using sulfurous acid or sulfites. The lignosulfonic acid used in the present invention is thus obtainable in the course of producing cellulose when starting from wood as natural raw material. One step of producing cellulose involves mixing the lignin-containing wood fibers with sulfurous acid. In this treatment, the lignin is sulfonated and converted into lignosulfonic acid which then, on neutralization with a suitable base, forms the corresponding salt. Water-soluble salts of said lignosulfonic acid with sodium, ammonium, calcium, magnesium and so on are obtained, depending on the base used. Lignosulfonates are generally in the form of a bright yellow to dark brown, virtually odorless, nonhygroscopic and sufficiently stable powder (decomposition at about 200° C.). Their molecular weight is preferably in the range from 1000 to 70 000 and especially in the range from 7000 to 52 000 g/mol. Lignosulfonates are known and have already been used for various industrial purposes, such as the preparation of vanillin, as industrial cleaning agents, as flotation agents for ores, as dispersants for dyes, insecticides, pesticides, etc. They are also biodegradable products and are not toxic to humans or the environment. Even though all salts of lignosulfonic acid can be used in the invention, a preference is to use calcium lignosulfonate (CAS No. 8061-52-7), sodium lignosulfonate (CAS No. 8061-51-6), magnesium lignosulfonate and/or ammonium lignosulfonate. Sodium lignosulfonate and calcium lignosulfonate are particularly preferred. These compounds are each commercially obtainable under the designations BORREMENT® CA 120, BORRESPERSE® NA 200 or BORRESPERSE® NA 220 from BORREGAARD DEUTSCHLAND GmbH of Karlsruhe, Germany. The two products are predominantly obtained by starting from firwood (Épicéa). It will be appreciated that the lignosulfonate used can be present alone or in admixture with two or more other lignosulfonates.

The emulsion polymer consists to an extent of not less than 50 wt % and preferably to an extent of not less than 80 wt % of so-called primary monomers. Primary monomers are preferably selected from the group consisting of vinylaromatics having up to 20 carbon atoms, vinyl esters of saturated $C_1$- to $C_{20}$-carboxylic acids, esters of acrylic acid or of methacrylic acid with monohydric $C_1$- to $C_{20}$-alcohols, aliphatic hydrocarbons having 2 to 8 carbon atoms and one or two double bonds, especially conjugated aliphatic dienes, or mixtures thereof.

Examples are alkyl(meth)acrylate with a C1-C10-alkyl radical, such as methyl methacrylate, methyl acrylate, n-butyl acrylate, ethyl acrylate and 2-ethylhexyl acrylate. Mixtures of alkyl(meth)acrylates are also suitable in particular. Vinyl esters of carboxylic acids having 1 to 20 carbon atoms are for example vinyl laurate, vinyl stearate, vinyl propionate, vinyl versatate and vinyl acetate. Useful vinylaromatic compounds include vinyltoluene, alpha-methylstyrene, p-methylstyrene, alpha-butylstyrene, 4-n-butylstyrene, 4-n-decylstyrene and preferably styrene. Ethylene, propylene, 1,3-butadiene, isoprene and chloroprene may be mentioned as hydrocarbons having 2 to 8 carbon atoms and one or two olefinic double bonds.

Preferred primary monomers include styrene, butadiene, C1 to C20 alkyl(meth)acrylates, vinyl acetate and ethylene.

Particular preference is given to C1-C20-alkyl(meth)acrylates, especially C1-C10-alkyl(meth)acrylates and mixtures of alkyl(meth)acrylates with vinylaromatics, especially with styrene (collectively also referred to as polyacrylate binders); or hydrocarbons having 2 double bonds, especially 1,3-butadiene, or mixtures of such hydrocarbons with vinylaromatics, especially with styrene (collectively also referred to as polybutadiene binders). In polybutadiene binders, the weight ratio of butadiene to vinylaromatics (especially styrene) may be for example in the range from 10:90 to 90:10 and may preferably be in the range from 20:80 to 80:20. In polyacrylate binders, the weight ratio of C1 to C20 alkyl(meth)acrylates to vinylaromatics (especially styrene) may be for example in the range from 10:90 to 90:10 and may preferably be in the range from 20:80 to 80:20.

In one embodiment of the invention, the emulsion polymer is constructed to an extent of not less than 50 wt % from mixtures of 1,3-butadiene and styrene or to an extent of not less than 50 wt % from mixtures of C1 to C20 alkyl(meth) acrylates and styrene.

Preferably, the chain growth addition polymer is constructed to an extent of not less than 0.1 wt %, for example to an extent in the range from 0.2 to 10 wt %, from one or more secondary monomers, based on the sum total of all monomers. Secondary monomers are preferably selected from the group consisting of ethylenically unsaturated carbonitriles, N,N-dialkylaminoalkylacrylamides, N,N-dialkylaminoalkylmethacrylamides, N,N-dialkylaminoalkyl acrylates, N,N-dialkylaminoalkyl methacrylates, glycidyl acrylate and glycidyl methacrylate, wherein the alkyl groups each preferably have from 1 to 20 or from 1 to 10 carbon atoms. Acrylonitrile and methacrylonitrile are examples of nitriles. Acrylonitrile, glycidyl(meth)acrylate and dimethylaminoethyl(meth)acrylate are particularly preferred.

In addition to primary monomers and secondary monomers, the chain growth addition polymer may optionally also be constructed from other monomers, for example from ethylenically unsaturated acids, ethylenically unsaturated carboxamides, allyl esters of saturated carboxylic acids, vinyl halides, dialkyl esters of ethylenically unsaturated dicarboxylic acids having preferably 1 to 20 carbon atoms in the alkyl groups, vinyl ketones, N-vinylpyrrolidone, N-vinylpyrrolidine, N-vinylformamide, hydroxyl-containing monomers, especially C1-C10-hydroxyalkyl(meth)acrylates, or vinyl ethers of alcohols comprising 1 to 10 carbon atoms. Vinyl halides are chlorinated, fluorinated or brominated ethylenically unsaturated compounds, preferably vinyl chloride and vinylidene chloride. Vinyl methyl ether and vinyl isobutyl ether may be mentioned as examples of vinyl ethers. Vinyl ethers of alcohols comprising from 1 to 4 carbon atoms are preferred. The amount of other monomers is for example in the range from 0 to 10 wt % or from 0.1 to 10 wt %. Acrylamide and methacrylamide are examples of ethylenically unsaturated carboxamides.

Monomers having carboxylic acid, sulfonic acid or phosphonic acid groups are examples of ethylenically unsaturated acids. Carboxylic acid groups are preferred. Acrylic acid, methacrylic acid, itaconic acid, maleic acid or fumaric acid and aconitic acid may be mentioned by way of example. The level of ethylenically unsaturated acids in the emulsion polymer is generally below 10 wt %, for example in the range from 0.1 to 9 wt %.

One embodiment of the invention utilizes as monomers
(A1) 19.8 to 80 parts by weight of at least one vinylaromatic compound,
(B1) 19.8 to 80 parts by weight of at least one conjugated aliphatic diene,
(C1) 0.1 to 15 parts by weight of at least one ethylenically unsaturated acid and
(D1) 0 to 20 parts by weight of at least one further monoethylenically unsaturated monomer other than the monomers (A1) to (C1);
together with
(E1) 0.01 to 1 part by weight, based on 100 parts by weight of monomers, of copolymerizing, branching or crosslinking monomers, other than the monomers (A1)-(D1), selected from monomers having two or more free-radically polymerizable, ethylenically unsaturated groups, and
10 to 100 parts by weight of lignosulfonate per 100 parts by weight of monomers,
wherein the sum total of the parts by weight of the monomers (A1) to (E1) is 100.

One embodiment of the invention utilizes as monomers
(A2) 19.8 to 80 parts by weight of at least one vinylaromatic compound,
(B2) 19.8 to 80 parts by weight of at least one monomer selected from C1- to C18-alkyl esters of acrylic acid and C1- to C18-alkyl esters of methacrylic acid;
(C2) 0.1 to 15 parts by weight of at least one ethylenically unsaturated acid and
(D2) 0 to 20 parts by weight of at least one further monoethylenically unsaturated monomer other than the monomers (A2) to (C2);
together with
(E2) 0.01 to 1 part by weight, based on 100 parts by weight of monomers, of copolymerizing, branching or crosslinking monomers, other than the monomers (A2)-(D2), selected from monomers having two or more free-radically polymerizable, ethylenically unsaturated groups, and
10 to 80 parts by weight of lignosulfonate per 100 parts by weight of monomers, wherein the sum total of the parts by weight of the monomers (A2) to (E2) is 100.

Vinylaromatic compounds are useful as monomers of group (A1) or (A2), examples being styrene, α-methylstyrene and/or vinyltoluene. Styrene is preferred among this group of monomers. 100 parts by weight of the monomer mixtures used altogether in the polymerization comprise for example from 19.8 to 80 parts by weight and preferably from 25 to 70 parts by weight of at least one monomer of group (A1) or (A2), respectively.

Examples of monomers of group (B1) are butadiene-1,3, isoprene, pentadiene-1,3, dimethyl-butadiene-1,3 and cyclopentadiene. Butadiene-1,3 and/or isoprene are preferred among this group of monomers. 100 parts by weight of monomer mixtures used altogether in the emulsion polymerization comprise for example from 19.8 to 80 parts by weight, preferably from 25 to 70 parts by weight and especially from 25 to 60 parts by weight of at least one monomer of group (B1).

Examples of monomers of group (C1) or (02) are ethylenically unsaturated carboxylic acids, ethylenically unsaturated sulfonic acids and vinylphosphonic acid. The ethylenically unsaturated carboxylic acids used are preferably α,β-monoethylenically unsaturated mono- and dicarboxylic acids having from 3 to 6 carbon atoms in the molecule. Examples thereof are acrylic acid, methacrylic acid, itaconic acid, maleic acid, fumaric acid, crotonic acid, vinylacetic acid and vinyllactic acid. Useful ethylenically unsaturated sulfonic acids include for example vinylsulfonic acid, styrenesulfonic acid, acrylamidemethylpropanesulfonic acid, sulfopropyl acrylate and sulfopropyl methacrylate. Acrylic acid and methacrylic acid are particularly preferred, especially acrylic acid.

The acid-functional monomers of group (C1) or (C2) can be used in the polymerization in the form of the free acids and also partially or completely neutralized with suitable bases. Preference is given to using aqueous sodium hydroxide solution, aqueous potassium hydroxide solution, or ammonia as neutralizing agent. 100 parts by weight of the monomer mixtures used in the emulsion polymerization comprise for example from 0.1 to 15 parts by weight, preferably from 0.1 to 10 parts by weight or from 1 to 8 parts by weight of at least one monomer of group (C1) or (C2).

As monomers of group (B2) there may be used esters of acrylic acid and of methacrylic acid with monohydric $C_1$- to $C_{18}$-alcohols such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate. 100 parts by weight of the monomer mixtures used altogether in the polymerization comprise for example from 19.8 to 80 parts by weight and preferably from 25 to 70 parts by weight of at least one monomer of group (B2).

Other monoethylenically unsaturated compounds are contemplated for use as monomers of group (D2). The abovementioned secondary monomers are preferred examples thereof.

In one embodiment of the invention, the further monomers (D1) and (D2) are each used in amounts of 0.1-15 parts by weight; the vinylaromatic compound is selected from styrene, methylstyrene and their mixture; the conjugated aliphatic diene is selected from 1,3-butadiene, isoprene and their mixture; and the ethylenically unsaturated acid is selected from one or more compounds of the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate, vinylphosphonic acid and salts thereof.

The chain growth addition polymer is in a branched or crosslinked state. In one embodiment, the acrylate copolymer is in a branched or crosslinked state as a result of at least one branching or crosslinking monomer having been copolymerized in an amount of 0.01 to 5 wt % and preferably of 0.01 to 1.00 wt %, based on total monomers. Branching or crosslinking monomers are monomers having two or more free-radically polymerizable, ethylenically unsaturated groups, except that the conjugated aliphatic dienes used as primary monomers shall be excluded, and/or the branching or crosslinking monomers shall be different from the other monomers A1 to D1 or, respectively, A2 to D2. Examples of suitable branching or crosslinking monomers are polyfunctional acrylates or polyfunctional methacrylates, especially alkanediol diacrylates or alkanediol dimethacrylates having preferably from 2 to 8 carbon atoms in the alkane group. Ethylene glycol diacrylate, propylene glycol diacrylate, polyethylene glycol diacrylate, hexanediol diacrylate, ethylene glycol dimethacrylate, diethylene glycol dimethacrylate, 1,3 butaneglycol dimethacrylate are suitable for example. Examples of tri(meth)acrylates are trimethylolpropane trimethacrylates, ethoxylated trimethylpropane triacrylate, pentaerythritol triacrylates, pentaerythritol trimethacrylate or trimethylolpropane trimethacrylate. Useful branching or crosslinking monomer further include divinyl compounds, especially divinyl esters such as, for example, divinylbenzene, divinyl succinate, divinyl adipate, divinyl maleate, divinyl oxalate, divinyl malonate or divinyl glutarate. The abovementioned alkanediol di(meth)acrylates are particularly preferred.

The emulsion polymerization typically utilizes initiators that form free radicals under the reaction conditions. The initiators are used for example in a concentration of 0.1 to 30 wt %, preferably 0.5 to 20 wt %, particularly preferably 1.0 to 10 wt %, based on the monomers to be polymerized. Multiple, different initiators may also be used in the emulsion polymerization. Polymerization initiators include, for example, organic peroxides, organic hydroperoxides, hydrogen peroxide, sodium persulfate, potassium persulfate, redox catalysts and azo compounds such as 2,2-azobis(4-methoxy-2,4-dimethylvaleronitrile), 2,2-azobis(2,4-dimethylvaleronitrile) and 2,2-azobis(2-amidinopropane)dihydrochloride. Examples of further initiators are dibenzoyl peroxide, tert.-butyl perpivalate, tert.-butyl per-2-ethylhexanoate, di-tert-butyl peroxide, diamyl peroxide, dioctanoyl peroxide, didecanoyl peroxide, dilauroyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl perbenzoate, tert-butyl hydroperoxide, azobisisobutyronitrile, 2,2"-azobis(2-methylbutyronitrile), 2,2"-azobis(2,4-dimethylvaleronitrile) and 2,2"-azobis(N,N"-dimethyleneisobutyroamidine)dihydrochloride.

The polymerization can also be initiated by means of high-energy rays such as electron beams or irradiation with UV light. Initiators are preferably selected from the group consisting of organic peroxides, organic hydroperoxides and hydrogen peroxide.

Reduction-oxidation initiator systems (redox initiator systems) consisting of a reducing agent and an oxidizing agent are particularly preferred. The abovementioned initiators for the emulsion polymerization are examples of preferred oxidation components. Particularly suitable reduction components in the Redox initiator systems are sodium hydroxymethanesulfinate or acetone bisulfide and also soluble metal compounds whose metallic component can occur in two or more valence states e.g. $Fe^{2+}$. Particularly suitable oxidation components are $H_2O_2$ or a peroxide which forms hydrophobic free radicals such as tert-butyl hydroperoxide.

Examples of particularly suitable Redox initiator systems are
$Fe^{2+}/H_2O_2$
sodium hydroxymethanesulfinate/tert-butyl hydroperoxide
acetone bisulfide/tert-butyl hydroperoxide One embodiment of the invention provides an aqueous polymer dispersion, utilizing as monomers
(A1) 19.8 to 80 parts by weight of at least one vinylaromatic compound,
(B1) 19.8 to 80 parts by weight of at least one conjugated aliphatic diene,
(C1) 0.1 to 15 parts by weight of at least one ethylenically unsaturated acid and
(D1) 0.2 to 10 wt % of at least one secondary monomer selected from the group consisting of acrylonitrile, glycidyl(meth)acrylate and dimethylaminoethyl(meth)acrylate;
together with
(E1) 0.01 to 1 part by weight, based on 100 parts by weight of monomers, of copolymerizing, branching or crosslinking monomers, other than the monomers (A1)-(D1), selected from monomers having two or more free-radically polymerizable, ethylenically unsaturated groups, and
10 to 100 parts by weight of lignosulfonate per 100 parts by weight of monomers; or
(A2) 19.8 to 80 parts by weight of at least one vinylaromatic compound, (B2) 19.8 to 80 parts by weight of at least one monomer selected from C1- to C18-alkyl esters of acrylic acid and C1- to C18-alkyl esters of methacrylic acid;

(C2) 0.1 to 15 parts by weight of at least one ethylenically unsaturated acid and (D2) 0.2 to 10 wt % of at least one secondary monomer selected from the group consisting of acrylonitrile, glycidyl(meth)acrylate and dimethylaminoethyl(meth)acrylate;

together with (E2) 0.01 to 1 part by weight, based on 100 parts by weight of monomers, of copolymerizing, branching or crosslinking monomers, other than the monomers (A2)-(D2), selected from monomers having two or more free-radically polymerizable, ethylenically unsaturated groups, and 10 to 80 parts by weight of lignosulfonate per 100 parts by weight of monomers, wherein the sum total of the parts by weight of the monomers (A1) to (E1) or (A2) to (E2) is in each case 100, and wherein sodium hydroxymethanesulfinate/tert-butyl hydroperoxide or $Fe^{2+}/H_2O_2$ is used in either case as polymerization initiator.

The invention also provides a process for preparing aqueous polymer dispersions according to the invention, wherein an emulsion polymerization is initiated free-radically and a chain growth addition polymer is formed from one or more of the above-mentioned ethylenically unsaturated, free-radically polymerizable monomers, wherein the chain growth addition polymer is formed to an extent of not less than 50 wt % from of the abovementioned primary monomers, wherein the monomers are polymerized in the presence of lignosulfonate and wherein the chain growth addition polymer is branched or crosslinked.

To augment the dispersal of the monomers in the aqueous medium, the protective colloids and/or emulsifiers customarily used as dispersants can be used. A detailed description of suitable protective colloids is given in Houben-Weyl, Methoden der organischen Chemie, volume XIV/1, Makromolekulare Stoffe, Georg-Thieme-Verlag, Stuttgart, 1961, pages 411 to 420. Suitable emulsifiers include surface-active substances whose number average molecular weight is typically below 2000 g/mol or preferably below 1500 g/mol, while the number average molecular weight of the protective colloids is above 2000 g/mol, for example in the range from 2000 to 100 000 g/mol and more particularly in the range from 5000 to 50 000 g/mol. Suitable emulsifiers include, for example, ethoxylated $C_8$-$C_{36}$ fatty alcohols having a degree of ethoxylation in the range from 3 to 50, ethoxylated mono-, di- and tri-$C_4$-$C_{12}$-alkylphenols having a degree of ethoxylation in the range from 3 to 50, alkali metal salts of dialkyl esters of sulfosuccinic acid, alkali metal and ammonium salts of $C_8$-$C_{12}$ alkyl sulfates, alkali metal and ammonium salts of $C_{12}$-$C_{18}$ alkylsulfonic acids and alkali metal and ammonium salts of $C_9$-$C_{18}$ alkylarylsulfonic acids. Cation-active emulsifiers are, for example, compounds having at least one amino or ammonium group and at least one C8-C22 alkyl group. When emulsifiers and/or protective colloids are used as auxiliaries to disperse the monomers, the amounts used thereof are for example in the range from 0.1 to 5 wt %, based on the monomers.

Useful protective colloids include for example degraded starch, more particularly maltodextrin or glucose syrup. Useful starting starches for preparing degraded starches include all native starches such as starches from maize (corn), wheat, oats, barley, rice, millet, potato, peas, tapioca, sorghum or sago. Also of interest are those natural starches which have a high amylopectin content such as wax maize starch and wax potato starch. The amylopectin content of these starches is above 90%, usually in the range from 95 to 100%. Starches modified chemically by etherification or esterification can also be used for preparing the polymer dispersions of the present invention. Such products are known and commercially available.

They are prepared for example by esterification of native starch or degraded native starch with inorganic or organic acids, their anhydrides or chlorides. Of particular interest are phosphated and acetylated degraded starches. The most common method to etherify starches consists in treating starch with organic halogen compounds, epoxides or sulfates in aqueous alkaline solution. Known starch ethers are alkyl ethers, hydroxyalkyl ethers, carboxyalkyl ethers and allyl ethers. The reaction products of starches with 2,3-epoxypropyltrimethylammonium chloride are also useful. Particular preference is given to degraded native starches, more particularly native starches degraded to maltodextrin or glucose syrup. Further suitable starches include cationically modified starches, i.e., starch compounds having amino groups or ammonium groups. The degraded starches have for example an intrinsic viscosity $\eta_i$ of less than 0.07 dl/g or less than 0.05 dl/g. The intrinsic viscosity $\eta_i$ of the degraded starches is preferably in the range from 0.02 to 0.06 dl/g. The intrinsic viscosity n, is determined in accordance with DIN EN1628 at a temperature of 23° C.

One embodiment of the invention provides aqueous polymer dispersions which are in accordance with the present invention, wherein the emulsion polymerization is effected in an aqueous medium in the presence of free-radical initiators and of one or more than one carbohydrate compound in the form of a degraded starch.

In one embodiment of the invention, the emulsion polymerization is effected in the presence of seed particles. The initial charge then comprises polymer seed, more particularly a polystyrene seed, i.e., an aqueous dispersion of finely divided polymer, preferably polystyrene, having a particle diameter of 20 to 40 nm.

The emulsion polymerization takes place in an aqueous medium. The aqueous medium may comprise for example completely ion-free water or else mixtures of water and a miscible solvent such as methanol, ethanol or tetrahydrofuran. As soon as the particular polymerization temperature desired is reached or within the time span of 1 to 15 minutes, preferably 5 to 15 minutes after reaching the polymerization temperature, the metered addition of the monomers is commenced. They can be for example pumped into the reactor continuously within for example 60 minutes to 10 hours, usually within 2 to 4 hours. The reaction mixture is preferably heated in the initial charge to the temperature required for the polymerization to proceed. These temperatures are for example in the range from 60 to 95° C., preferably 70 to 90° C. The polymerization can also be performed under pressure, e.g., at pressures up to 15 bar, e.g., at 2 to 10 bar. Adding the monomer can take place as a batch process, continuously or in stages.

The polymerization may be carried out in the presence of chain transfer agents to control molecular weight. Examples of optional chain transfer agents are organic compounds comprising sulfur in bound form such as mercaptoethyl propionate, thiodiglycol, ethylthioethanol, di-n-butyl sulfide, di-n-octyl sulfide, diphenyl sulfide, diisopropyl disulfide, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea. Useful chain transfer agents further include aldehydes such as formaldehyde, acetaldehyde and propionaldehyde, organic acids such as formic acid, sodium formate or ammonium formate, alcohols such as, more particularly, isopropanol and also phosphorus compounds such as sodium hypophosphite. The total amount of chain transfer agents is for example in the range from 0.01 to 5 and preferably from 0.1 to 1 wt %, based on the monomers used in the polymerization. Chain transfer agents are preferably dosed together with the monomers. However, they may also be wholly or partly included in the initial charge. They may also be dosed in stages offset relative to the monomers.

After the polymerization has ended, further initiator may optionally be added to the reaction mixture and a post polymerization performed at the same temperature as the main polymerization or else at a lower or higher temperature. To complete the polymerization reaction, it will in most cases suffice to stir the reaction mixture at the polymerization temperature for example 1 to 3 hours after addition of all the monomers. The pH in the polymerization can be for example in the range from 1 to 7. After polymerization, the pH is adjusted to a value of between 5 and 8 for example.

In the aqueous polymer dispersion obtained, the dispersed particles have an average particle diameter of preferably 80 to 300 nm particularly from 80 to 200 nm or from 90 to 150 nm. The average particle diameter of the polymer particles can be determined by dynamic light scattering on a 0.005 to 0.01 wt % aqueous polymer dispersion at 23° C. by means of an Autosizer IIC from Malvern Instruments, England. The reported data are all based on the cumulant z-average diameter of the measured autocorrelation function as per ISO standard 13321.

The chain growth addition polymers have a glass transition temperature Tg of preferably less than 50° C., especially below 30° C. The glass transition temperature can be determined by differential scanning calorimetry (ASTM D 3418-08, as "midpoint temperature").

In one embodiment, the solids content of the aqueous polymer dispersion of the present invention is in the range from 40 to 60 wt %. The solids content can be effected for example through appropriate adjustment of the water quantity and/or of the monomer quantities used in the emulsion polymerization.

The emulsion polymers of the present invention are used for producing paper coating compositions, especially as binders in paper coating compositions.

The invention accordingly also provides a paper coating composition comprising
(i) inorganic pigments and
(ii) an above-described aqueous polymer dispersion obtainable by the process of the present invention
and optionally further added substances.

Paper coating compositions, in addition to water, generally comprise pigments, binders and auxiliaries for setting the requisite rheological properties, for example thickeners. The pigments are typically dispersed in water. The paper coating composition comprises pigments in an amount of preferably at least 80 wt %, for example 80 to 95 wt % or 80 to 90 wt %, based on the total solids content. White pigments are contemplated in particular. Suitable pigments include, for example, metal salt pigments such as, for example, calcium sulfate, calcium aluminate sulfate, barium sulfate, magnesium carbonate and calcium carbonate, of which carbonate pigments, more particularly calcium carbonate, are preferred. The calcium carbonate may be natural ground calcium carbonate (GCC), precipitated calcium carbonate (PCC), lime or chalk. Suitable calcium carbonate pigments are available for example as Covercarb® 60, Hydrocarb® 60 or Hydrocarb® 90 ME. Further suitable pigments include, for example, silicas, aluminas, aluminum hydrate, silicates, titanium dioxide, zinc oxide, kaolin, argillaceous earths, talc or silicon dioxide. Suitable further pigments are available for example as Capim® MP 50 (Clay), Hydragloss® 90 (Clay) or Talcum 010.

The paper coating composition comprises at least one binder. The polymer dispersion prepared according to the present invention can be used in the paper coating composition as sole binder or in combination with further binders. The most important functions of binders in paper coating compositions are to bind the pigments to the paper and the pigments to each other and to some extent fill voids between pigment particles. For every 100 parts by weight of pigments, the amount of organic binder used (in terms of binder solids, i.e. without water or other solvent liquid at 21° C., 1 bar) is for example in the range from 1 to 50 parts by weight, preferably in the range from 1 to 25 parts by weight or in the range from 5 to 20 parts by weight.

Useful further binders include natural-based binders, more particularly binders based on starch, and also synthetic binders other than the polymers prepared according to the present invention, more particularly emulsion polymers obtainable by emulsion polymerization. Chain growth addition polymers prepared according to the present invention are preferably present as the sole synthetic binder. A binder based on starch is in this context to be understood as referring to any native, modified or degraded starch. Native starches can consist of amylose, amylopectin or mixtures thereof. Modified starches may comprise oxidized starch, starch esters or starch ethers. Hydrolysis can be used to reduce the molecular weight of the starch (degraded starch). Possible degradation products include oligosaccharides or dextrins. Preferred starches are cereal starch, maize starch and potato starch. Particular preference is given to cereal starch and maize starch and very particular preference is given to cereal starch.

Paper coating compositions of the present invention may additionally comprise further additives and auxiliary materials, for example fillers, co-binders and thickeners to further optimize viscosity and water retention, optical brighteners, dispersants, surfactants, lubricants (e.g., calcium stearate and waxes), neutralizing agents (e.g., NaOH or ammonium hydroxide) for pH adjustment, defoamers, deaerators, preservatives (biocides for example), flow control agents, dyes (soluble dyes in particular), etc. Useful thickeners in addition to synthetic polymers (crosslinked polyacrylate for example) include particularly celluloses, preferably carboxymethylcellulose. Optical brighteners are, for example, fluorescent or phosphorescent dyes, particularly stilbenes.

The paper coating composition of the present invention preferably comprises an aqueous paper coating composition; water is present therein particularly due to the make-up form of the constituents (aqueous polymer dispersions, aqueous pigment slurries); the desired viscosity can be set by adding further water. Customary solids contents of paper coating compositions range from 30 to 50 wt %. The pH of the paper coating composition is preferably adjusted to values in the range from 6 to 10, more particularly in the range from 7 to 9.5.

One embodiment of the invention relates to a paper coating composition wherein the polymers of the aqueous polymer dispersion prepared according to the invention are used in an amount of 1 to 50 parts by weight, based on the total amount of pigments, and wherein the pigments are present in an amount of 80 to 95 parts by weight, based on the total solids content and are selected from the group consisting of calcium sulfate, calcium aluminate sulfate, barium sulfate, magnesium carbonate, calcium carbonate, silicas, aluminas, aluminum hydrate, silicates, titanium dioxide, zinc oxide, kaolin, argillaceous earth, talc and silicon dioxide, and wherein the paper coating composition further comprises at least one secondary selected from the group consisting of thickeners, further polymeric binders, co-binders, optical brighteners, fillers, flow control agents, dispersants, surfactants, lubricants, neutralizing agents, defoamers, deaerators, preservatives and dyes.

The invention also provides paper or card coated with a paper coating composition of the present invention and also a process for coating paper or card, which comprises
 preparing or providing an aqueous polymer dispersion according to the invention; and
 using this polymer dispersion, at least one of the above-mentioned pigments and optional further auxiliaries to prepare a paper coating composition; and applying the paper coating composition to at least one surface of paper or card.

The paper coating composition is preferably applied to uncoated base papers or uncoated card. The amount is generally in the range from 1 to 50 g, and preferably in the range from 5 to 30 g (in terms of solids, i.e., without water or other solvent liquid at 21° C., 1 bar) per square meter. Coating can be effected by means of customary methods of application, for example via size press, film press, blade coater, air brush, doctor blade, curtain coating or spray coater. Depending on the pigment system, the aqueous dispersions of the water-soluble copolymers can be used in paper coating compositions for the basecoat and/or for the topcoat.

Paper coating compositions of the present invention have good performance characteristics. They have good runability in paper coating processes and a high binding force. The coated papers and cards have good surface strength, more particularly very high wet and dry pick resistance. They are readily printable in the customary printing processes, such as relief printing, gravure, offset, digital, inkjet, flexographic, newsprint, letterpress, sublimation printing, laser printing, electrophotographic printing or a combination thereof. Using lignosulfonate in the manner of the present invention makes it possible to replace appreciable amounts of synthetic monomers in the emulsion polymers by a raw material having a natural, renewable base.

EXAMPLES

Unless the context suggests otherwise, percentages are always by weight. A reported content is based on the content in aqueous solution or dispersion.

Solids contents are determined by drying a defined amount of the particular aqueous polymer dispersion (about 5 g) at 140° C. in a drying cabinet to constant weight. Two separate measurements are carried out in each case and averaged.

Glass transition temperature is determined in accordance with DIN 53765 using a TA8000 series DSC820 instrument from Mettler-Toledo Int. Inc.

The average particle diameters of the polymer particles are determined by dynamic light scattering on a 0.005 to 0.01 wt % aqueous polymer dispersion at 23° C. by means of an Autosizer IIC from Malvern Instruments, England. The cumulant z-average diameter of the measured autocorrelation function (ISO standard 13321) is reported.

The following polymer dispersions were used in the performance tests:
Emulsion Polymerization to Produce Lignin-Containing Dispersions
 A polymerization vessel equipped with a stirrer, reflux condenser and dosing devices is initially charged with 69 g of a 45 wt % sodium lignosulfonate solution, 520 g of water and 5.6 g of a 40 wt % emulsifier solution (sodium C14-C15-alkylsulfonate, Emulsifier K30 from Bayer AG) and the pH is adjusted to 8.5 with sodium hydroxide. The mixture is heated to 85° C. under agitation, and then 9.75 g of a 10 wt % iron(II) sulfate solution are added. Thereafter the addition is commenced of 13.0 g of a 30 wt % hydrogen peroxide solution and of 42.9 g of water. At the same time the addition takes place of 75.1 g of styrene, 78.0 g of t-butyl acrylate, 0.98 g of butanediol diacrylate and 1.95 g of 2-dimethylaminoethyl methacrylate. The monomer and hydrogen peroxide streams are added over 120 min, thereafter the reactor contents are left to postreact at 85° C. for a further 60 min. Then, a stream of 39.0 g of a 10% tert-butyl hydroxide solution is added over 30 min followed by 90 min of postpolymerization. The reactor contents are then cooled down to room temperature.

The dispersion thus produced has a solids content of 19%, an LT value of 87% (transmission of white light) and a particle diameter of 120 nm.

Polymer dispersions D1-D7 (see table 1) can be prepared in a similar manner.
Emulsion Polymerization to Produce Lignin-Containing Dispersion D8
 A polymerization vessel equipped with a stirrer, reflux condenser and dosing devices is initially charged with 50 g of Amylex 15 (potato starch from L720) and 370 g of water before heating at 80° C. with stirring. Then, 1.00 g of a 1 wt % enzyme solution (a-amylase, Termamyl 120 L from Novo Nordisk) is added and the batch is stirred for 20 min. This is followed by the addition of 4.00 g of a 10.0 wt % iron(II) sulfate solution and also the addition of 44.44 g of a 45 wt % sodium lignosulfonate solution (Borregaard Deutschland GmbH). The reaction temperature is raised to 85° C. over 5 min and at the same time the addition is commenced of 68 g of a 5.0 wt % hydrogen peroxide solution for 165 min and also the addition of 66.25 g of styrene, 69.25 g of n-butyl acrylate, 2.00 g of acrylonitrile, 1.50 g of acrylic acid, 1.00 g of butanediol diacrylate, 0.60 g of terpinolene, 0.50 g of a 40 wt % emulsifier solution (sodium C14-C15-alkylsulfonate, Emulsifier K30 from Bayer AG) and also 110 g of water over 120 min. Thereafter, 11.30 g of water are added. Once the addition of initiator is complete, the reactor contents are postreacted at 85° C. for 30 min. This is followed by the addition of 2.00 g of a 10% tert-butyl hydroperoxide solution and the batch is subsequently stirred for 30 min. The reactor contents are then cooled down to room temperature to obtain a dispersion having a solids content of 24.2% and a particle diameter of 98 nm.
Emulsion Polymerization to Produce a Lignin-Containing Dispersion Having a Solids Contents of 50% D10
 A polymerization vessel equipped with a stirrer, reflux condenser and dosing devices is initially charged with 449 g of a 45 wt % sodium ligninsulfonate solution (Borregaard Deutschland GmbH), 147 g of water and 12.6 g of a 40 wt % emulsifier solution (sodium C14-C15 alkylsulfonates, emulsifier K30 from Bayer AG) and the pH is adjusted to 4.5 with acetic acid. The mixture is heated to 70° C. under agitation. Thereafter the addition is commenced of 90 g of a 10 wt % tert-butyl hydroperoxide solution stream and of 6.48 g sodium hydroxymethanesulfinate (Rongalit C) and 13.2 g of water stream, while at the same time a stream of 140 g styrene, 148 g of n-butyl acrylate, 3 g of butanediol diacrylate and 9 g of acrylic acid is added. The monomer, tert-butyl hydroperoxide and Rongalit C streams are added over 120 min, thereafter the reactor contents are left to postreact at 70° C. for further 60 min. Then, a stream of 30.0 g of a 10% tert-butyl hydroperoxide solution is added over 30 min followed by 90 min of postpolymerization. The reactor contents are then cooled down to room temperature. The dispersion thus produced has a solids content of 49%, an LT value of 76% (transmission of white light), a particle diameter of 200 nm and viscosity of 158 mPas.

The compositions of the polymer dispersions are summarized in table 1.

Abbreviations Used:
Lignin sodium lignosulfonate
nBA n-butyl acrylate
EHA 2-ethylhexyl acrylate
BDDA butanediol diacrylate
Amylex 15 potato starch
DMAEMA dimethylaminoethyl methacrylate
AN acrylonitrile
GMA glycidyl methacrylate
AA acrylic acid Coating Slip Formulation (Parts by Weight of Solids)
100 parts of finely divided calcium carbonate (Hydrocarb 60, Omya)
7 parts of coating slip binder (polymer dispersions D1 to D11)
0.25 part of thickener (Sterocoll® FS)
Solids content is 64 wt %. pH is about 9.

The coating slip is applied to one side of uncoated base paper using a semi-commercial coating machine, and dried via IR radiator. The weight of the coat applied is about 10 g/m$^2$.

The coated paper was tested for surface strength using test methods known to a person skilled in the art. The following test methods were used:
IGT dry pick resistance
IGT wet pick resistance

TABLE 1

Composition of polymer dispersions, quantitative particulars of monomers in parts by weight

| Example | Lignin and primary monomers [%] | Cross-linker [%] | Secondary monomers [%] | Initiator [%] | Polymerization temperature [° C.] | Solids content [%] |
|---|---|---|---|---|---|---|
| D1 | 20 Lignin<br>30 nBA<br>40 styrene<br>10 EHA | — | — | 4 H$_2$O$_2$ | 55 | 20 |
| D2 | 20 Lignin<br>40 nBA<br>30 styrene<br>10 EHA | — | — | 2 H$_2$O$_2$ | 85 | 20 |
| D3 | 20 Lignin<br>40 nBA<br>39.5 styrene | 0.5 BDDA | — | 2 H$_2$O$_2$ | 85 | 20 |
| D4 | 20 Lignin<br>40 nBA<br>38.5 styrene | 0.5 BDDA | 1 DMAEMA | 2 H$_2$O$_2$ | 85 | 20 |
| D5 | 20 Lignin<br>40 nBA<br>38.5 styrene | 0.5 BDDA | 1 AN | 2 H$_2$O$_2$ | 85 | 20 |
| D6 | 20 Lignin<br>40 nBA<br>34.5 styrene | 0.5 BDDA | 5 AN | 2 H$_2$O$_2$ | 85 | 20 |
| D7 | 20 Lignin<br>40 nBA<br>38.5 styrene | 0.5 BDDA | 1 GMA | 2 H$_2$O$_2$ | 85 | 20 |
| D8 | 20 Amylex 15<br>10 Lignin<br>34.6 nBA<br>33.1 styrene | 0.5 BDDA | 1 AN<br>0.75 AA | 1.7 H$_2$O$_2$ | 85 | 20 |
| D9 | 20 Lignin<br>40 nBA<br>39 styrene | — | 1 DMAEMA | 2.5 H$_2$O$_2$ | 85 | 20 |
| D10 | 40 Lignin<br>29.5 nBA<br>28 styrene | 0.5 BDDA | 2 acrylic acid | 1 tert-butyl hydroperoxide | 70 | 50 |
| D11 | 40 Lignin<br>29.5 nBA<br>28 styrene | — | 2 acrylic acid | 1 tert-butyl hydroperoxide | 70 | 50 |

Aqueous polymer dispersions D1 to D11, produced as described in the abovementioned examples, are used as binders for paper coating compositions.

Paper Coating Composition Preparation:

The coating slip is prepared in a stirred assembly into which the individual components are fed in succession. The pigments are added in pre-dispersed form (as a slurry). The other components are added after the pigments, the order corresponding to the order in the reported coating slip formulation. Final solids content is set by adding water.

Offset test

The results are summarized in Table 1.

Measurement of Dry Pick Resistance with IGT Test Printer (IGT Dry)

Strips were cut out of the in-test papers and printed with the IGT test printer. The printing inks used are specific test inks from Lorilleux, which transmit different tensile forces. The test strips are fed through the press at continuously increasing speed (maximum speed 200 cm/s). To evaluate the result, the point at which 10 picks have occurred on the paper surface after the start of printing is determined on the sample printing strip. The measure reported for dry pick resistance is the speed in cm/sec present at this point during printing and also the test ink used.

The higher this printing speed at the tenth pick point, the better the quality rating of the paper surface.

Measurement of Wet Pick Resistance with IGT Test Printer (IGT Wet)

Strips were cut out of the in-test papers and printed with the IGT test printer. The printer was set up such that the test strips are moistened with water prior to the printing operation. The printing inks used are specific test inks from Lorilleux (No. 3807), which transmit different tensile forces. Printing is done at a constant speed of 0.6 cm/s. Picks out of the paper surface are visible as unprinted spots. To determine wet pick resistance, a color densitometer is used to determine color density in % compared with the full hue. The higher the reported color density, the better the wet pick resistance.

Offset Test

Next samples having a size of 240×46 mm are cut out of the in-test papers in the longitudinal direction. An appropriate amount of printing ink is applied to the inking roll and left to run for 1 minute. A printing disk is then inserted and inked for 30 s. The printing speed is 1 m/s. A paper strip is brought back to the starting position on a printing test support with the printed paper strip. After a specified time interval, the printing process is started again without replacing the printing disk. This operation is repeated more than once. After each printing cycle, the pick on the printed side of the paper strip is assessed by visual inspection. The table reports the number of cycles before picking occurred for the first time. The higher the number of cycles up to the occurrence of picking, the better the suitability of the papers for offset printing.

The measured results are summarized in table 2.

TABLE 2

Measured results of dry and wet pick resistance and offset test

| Dispersion | Dry pick resistance [cm/s] | Wet pick resistance [cm/s] | Offset cycles |
| --- | --- | --- | --- |
| D1 (comparator) | 19 | 22 | 1.00 |
| D2 (comparator) | 46 | 21.1 | 2.00 |
| D3 | 76 | 65 | 2.50 |
| D4 | 72 | 101 | 2.25 |
| D5 | 131 | 63 | 2.25 |
| D6 | 115 | 54 | 2.75 |
| D7 | 122 | 54 | 2.75 |
| D8 | 66 | 100 | 2.75 |
| D9 (comparator) | 13 | 14 | 1.25 |
| D10 | 82 | 71 | 2.50 |
| D11 (comparator) | 20 | 13 | 1.00 |

The measured results show that paper coating slips produced with the crosslinked lignin-containing polymer dispersions D3 to D8 and D10 lead to better results than paper coating slips produced with the uncrosslinked comparative dispersions D1, D2, D9 and D11, especially with regard to dry pick resistance and in the offset test.

The invention claimed is:

1. An aqueous polymer dispersion, comprising:
 particles of a crosslinked or branched chain growth addition polymer; and
 a lignosulfonate;
 wherein
 the chain growth addition polymer comprises:
 not less than 50 wt % of at least one polymerized primary monomer selected from the group consisting of vinylaromatic compounds, conjugated aliphatic dienes, vinyl esters of saturated $C_1$- to $C_{20}$-carboxylic acids, esters of acrylic acid with monohydric $C_1$- to $C_{20}$-alcohols, esters of methacrylic acid with monohydric $C_1$- to $C_{20}$-alcohols, aliphatic hydrocarbons having 2 to 8 carbon atoms and one or two double bonds, and
 at least one copolymerized branching or crosslinking monomer other than the at least one primary monomer which is selected from monomers having two or more free-radically polymerizable, ethylenically unsaturated groups;
 wherein the monomers are polymerized via free-radically initiated emulsion polymerization in the presence of the lignosulfonate and wherein
 a content of the lignosulfonate is from 10 to 100 parts by weight per 100 parts by weight of a total of the primary and the branching or crosslinking monomers.

2. The aqueous polymer dispersion according to claim 1, wherein the at least one primary monomer is selected from the group consisting of styrene, butadiene, C1 to C20 alkyl (meth)acrylates, vinyl acetate and ethylene.

3. The aqueous polymer dispersion according to claim 1, wherein the crosslinked or branched chain growth addition polymer comprises not less than 50 wt % of mixtures of butadiene and styrene or not less than 50 wt % of mixtures of C1 to C20 alkyl (meth)acrylates and styrene.

4. The aqueous polymer dispersion according to claim 1, wherein the crosslinked or branched chain growth addition polymer comprises not less than 0.1 wt % of at least one secondary monomer selected from the group consisting of ethylenically unsaturated carbonitriles, N,N-dialkylaminoalkylacrylamides, N,N-dialkylaminoalkylmethacrylamides, N,N-dialkylaminoalkyl acrylates, N,N-dialkylaminoalkyl methacrylates, glycidyl acrylate and glycidyl methacrylate.

5. The aqueous polymer dispersion according to claim 4, wherein a content of the secondary monomer is from 0.2 to 10 wt %, and the secondary monomer is at least one selected from the group consisting of acrylonitrile, glycidyl (meth) acrylate and dimethylaminoethyl (meth)acrylate.

6. The aqueous polymer dispersion according to claim 1, wherein the copolymerized branching or crosslinking monomer comprises an alkanediol di(meth)acrylate, and a content of the alkanediol di(meth)acrylate is from 0.01 to 5 part by weight based on 100 parts by weight of total monomers.

7. The aqueous polymer dispersion according to claim 1, wherein an average diameter of the particles of chain growth addition polymer dispersed in the polymer dispersion is from 80 to 300 nm.

8. The aqueous polymer dispersion according to claim 1, wherein a glass transition temperature of the chain growth addition polymer is less than 50° C.

9. The aqueous polymer dispersion according to claim 1, wherein the crosslinked or branched chain growth addition polymer comprises:
 (A1) from 19.8 to 80 parts by weight of a vinylaromatic compound,
 (B1) from 19.8 to 80 parts by weight of a conjugated aliphatic diene,
 (C1) from 0.1 to 15 parts by weight of an ethylenically unsaturated acid and
 (D1) from 0 to 20 parts by weight of a further monoethylenically unsaturated monomer other than the monomers (A1) to (C1);
 (E1) from 0.01 to 5 part by weight, based on 100 parts by weight of monomers, of copolymerizing, branching or crosslinking monomers selected from monomers having two or more free-radically polymerizable, ethylenically unsaturated groups;

or (A2) from 19.8 to 80 parts by weight of a vinylaromatic compound, (B2) from 19.8 to 80 parts by weight of a monomer selected from C1- to C18-alkyl esters of acrylic acid and C1- to C18-alkyl esters of methacrylic acid;

(C2) from 0.1 to 15 parts by weight of an ethylenically unsaturated acid and (D2) from 0 to 20 parts by weight of a further monoethylenically unsaturated monomer other than the monomers (A2) to (C2);

(E2) from 0.01 to 5 part by weight, based on 100 parts by weight of monomers, of copolymerizing, branching or crosslinking monomers selected from monomers having two or more free-radically polymerizable, ethylenically unsaturated groups wherein the sum total of the parts by weight of the monomers (A1) to (E1) or (A2) to (E2) is in each case 100.

10. The aqueous polymer dispersion according to claim 9, wherein
the vinylaromatic compound (A1) or (A2) is at least one of styrene and methylstyrene,
the conjugated aliphatic diene (B1) is at least one of 1,3-butadiene and isoprene,
the ethylenically unsaturated acid is at least one selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylomido-methylpropanesulfonic acid, sulfopropyl acrylate, sulfopropyl methacrylate, vinylphosphonic acid and salts thereof, and
(D1) and (D2) are present in an amount of 0.1-15 parts by weight.

11. The aqueous polymer dispersion according to claim 1, wherein the emulsion polymerization is effected in an aqueous medium in the presence of a free-radical initiator and a degraded starch.

12. The aqueous polymer dispersion according to claim 1, wherein the emulsion polymerization is effected in the presence of seed particles.

13. The aqueous polymer dispersion according to claim 1, wherein the initiator of the free-radically initiated emulsion polymerization is a reduction-oxidation initiator system.

14. The aqueous polymer dispersion according to claim 13, wherein
the reduction component of the initiator comprises sodium hydroxymethanesulfinate, acetone bisulfide or a soluble metal compound whose metallic component can occur in two or more valence states, and
the oxidation component of the initiator is $H_2O_2$ or a peroxide which forms a hydrophobic free radical.

15. The aqueous polymer dispersion according to claim 1, wherein the polymerization initiator for the free-radically initiated emulsion polymerization is $Fe^{2+}/H_2O_2$, sodium hydroxymethanesulfinate/tert-butyl hydroperoxide or acetone bidulfide/tert-butyl hydroperoxide.

16. The aqueous polymer dispersion according to claim 1, comprising:
(A1) from 19.8 to 80 parts by weight of a vinylaromatic compound;
(B1) from 19.8 to 80 parts by weight of a conjugated aliphatic diene;
(C1) from 0.1 to 15 parts by weight of an ethylenically unsaturated acid;
(D1) from 0.2 to 10 wt % of a secondary monomer selected from the group consisting of acrylonitrile, glycidyl (meth)acrylate and dimethylaminoethyl (meth)acrylate; and
(E1) from 0.01 to 5 part by weight, based on 100 parts by weight of monomers, of copolymerizing, branching or crosslinking monomers selected from monomers having two or more free-radically polymerizable, ethylenically unsaturated groups;

or (A2) from 19.8 to 80 parts by weight of a vinylaromatic compound;
(B2) from 19.8 to 80 parts by weight of a monomer selected from C1- to C18-alkyl esters of acrylic acid and C1- to C18-alkyl esters of methacrylic acid;
(C2) from 0.1 to 15 parts by weight of an ethylenically unsaturated acid;
(D2) from 0.2 to 10 wt % of at least one secondary monomer selected from the group consisting of acrylonitrile, glycidyl (meth)acrylate and dimethylaminoethyl (meth)acrylate; and
(E2) from 0.01 to 5 part by weight, based on 100 parts by weight of monomers, of copolymerizing, branching or crosslinking monomers selected from monomers having two or more free-radically polymerizable, ethylenically unsaturated groups;
wherein the sum total of the parts by weight of the monomers (A1) to (E1) or (A2) to (E2) is in each case 100,
and wherein sodium hydroxymethanesulfinate/tert-butyl peroxide or $Fe^{2+}/H_2O_2$ is the polymerization initiator.

17. A method for preparing the aqueous polymer dispersions according claim 1, wherein an emulsion polymerization is initiated free-radically and a chain growth addition polymer is formed from one or more ethylenically unsaturated, free-radically polymerizable monomers,
wherein the chain growth addition polymer is formed to an extent of not less than 50 wt % from primary monomers selected from the group consisting of vinylaromatic compounds, conjugated aliphatic dienes, vinyl esters of saturated $C_1$- to $C_{20}$-carboxylic acids, esters of acrylic acid or of methacrylic acid with monohydric $C_1$- to $C_{20}$-alcohols, aliphatic hydrocarbons having 2 to 8 carbon atoms and one or two double bonds, and mixtures thereof,
wherein the monomers are polymerized in the presence of the lignosulfonate and wherein the chain growth addition polymer is branched or crosslinked via copolymerization of at least one branching or crosslinking monomer selected from monomers having two or more free-radically polymerizable, ethylenically unsaturated groups.

18. A paper coating composition comprising
(i) inorganic pigments and
(ii) the aqueous polymer dispersion of claim 1.

19. A paper or card coated with the paper coating composition of claim 18.

* * * * *